(12) United States Patent
Garabello et al.

(10) Patent No.: US 9,200,706 B2
(45) Date of Patent: Dec. 1, 2015

(54) ELECTRO-HYDRAULIC ACTUATION GROUP FOR AN AUTOMOTIVE SERVO-ASSISTED MECHANICAL TRANSMISSION

(75) Inventors: Marco Garabello, Orbassano (IT); Andrea Piazza, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 512 days.

(21) Appl. No.: 13/642,190

(22) PCT Filed: Apr. 21, 2011

(86) PCT No.: PCT/IB2011/000880
§ 371 (c)(1),
(2), (4) Date: Nov. 19, 2012

(87) PCT Pub. No.: WO2011/132073
PCT Pub. Date: Oct. 27, 2011

(65) Prior Publication Data
US 2013/0055840 A1    Mar. 7, 2013

(30) Foreign Application Priority Data

Apr. 21, 2010 (EP) .................................... 10425129
Oct. 5, 2010 (EP) .................................... 10186533

(51) Int. Cl.
*F16H 61/30* (2006.01)
*F16H 57/02* (2012.01)
*F16H 61/00* (2006.01)
*F16H 61/688* (2006.01)

(52) U.S. Cl.
CPC ................ *F16H 61/30* (2013.01); *F16H 57/02* (2013.01); *F16H 61/0009* (2013.01); *F16H 61/0025* (2013.01); *F16H 61/688* (2013.01); *F16H 2057/02026* (2013.01); *F16H 2061/308* (2013.01); *Y10T 74/20024* (2015.01); *Y10T 74/2186* (2015.01)

(58) Field of Classification Search
CPC ... F16H 61/30; F16H 61/0025; F16H 61/688; F16H 61/0009; F16H 57/02; F16H 2061/308; F16H 2057/02026; Y10T 74/20024; Y10T 74/2186
USPC .......... 137/270, 271, 560, 884; 439/716, 717; 195/85.01; 477/166, 174–175, 180
See application file for complete search history.

(56) References Cited

U.S. PATENT DOCUMENTS

| 5,692,909 | A | 12/1997 | Gadzinski | |
| 8,074,680 | B2 * | 12/2011 | De Carolis et al. | ........... 137/560 |

(Continued)

FOREIGN PATENT DOCUMENTS

| EP | 1 118 800 | A2 | 7/2001 |
| EP | 1 462 681 | A2 | 9/2004 |
| FR | 2 703 007 | A1 | 9/1994 |

*Primary Examiner* — John Fox
*Assistant Examiner* — Michael R Reid
(74) *Attorney, Agent, or Firm* — Dickstein Shapiro LLP

(57) ABSTRACT

In an automotive servo-assisted mechanical transmission, an electro-hydraulic actuation group has an actuation unit, a power unit able to provide hydraulic pressure to the actuation unit and an electronic control unit, the actuation and power units being equipped with respective components that are all mounted on a hydraulic casing of the actuation unit so as to define with one another a single assembly, at least part of the components being equipped with respective electrical connectors that are arranged in a manner such that they can all be engaged by a same multiple electrical connector device, electrically connectable to the electronic control unit.

8 Claims, 7 Drawing Sheets

(56) References Cited

U.S. PATENT DOCUMENTS

| | | |
|---|---|---|
| 8,256,456 B2 * | 9/2012 | De Carolis et al. ........... 137/560 |
| 2001/0009881 A1 * | 7/2001 | Albs et al. ..................... 475/127 |
| 2002/0062714 A1 * | 5/2002 | Albert et al. ................. 74/606 R |
| 2006/0009326 A1 * | 1/2006 | Stefina .......................... 477/127 |
| 2011/0088796 A1 * | 4/2011 | Fannin et al. ............ 137/565.11 |

\* cited by examiner

ELECTRO-HYDRAULIC ACTUATION GROUP FOR AN AUTOMOTIVE SERVO-ASSISTED MECHANICAL TRANSMISSION

TECHNICAL FIELD OF THE INVENTION

The present invention relates to an electro-hydraulic actuation group for an automotive servo-assisted mechanical transmission.

In particular, the present invention finds particularly advantageous application in the case where the transmission is a dry dual clutch transmission, to which the description that follows will make explicit reference, but without any loss of generality.

STATE OF THE ART

As is known, an automotive servo-assisted mechanical transmission comprises a clutch unit, a gearbox with electro-hydraulic actuation and an electro-hydraulic actuation group for operating the clutch unit and for selecting and engaging the gears in the gearbox.

In general, an electro-hydraulic actuation group of known type can be broken down into three main subgroups: an actuation unit, which is provided with a hydraulic casing housing a hydraulic circuit and supporting a plurality of electrical and hydraulic components, a power unit that is able to supply the necessary hydraulic pressure for operating the actuation unit, and an electronic control unit able to control the actuation and power units.

According to a commonly adopted known solution, the actuation and power units define two distinct assemblies inside the electro-hydraulic actuation group, which are arranged side-by-side and made integral with each other via a connection bracket that is rigidly connected to the hydraulic casing and acts as a support frame for the power unit's components.

The actuation and power units assembled in this way are normally installed inside a housing outside the gearbox, next to electrical supply connections suitable for supplying the energy needed for operating the power and actuation units.

DISCLOSURE OF THE INVENTION

According to what the Applicant has discovered through experience, the electro-hydraulic actuation groups configured according to the known art described above constitute, up to now, a solution that is not very satisfactory and poorly meets the needs, especially felt in the automotive sector, for cost containment and size reduction.

In fact, given the arrangement of the power and actuation units, electro-hydraulic actuation groups of the above-described type suffer from the drawback of having relatively large bulk, outside of the gearbox, which makes their installation difficult and sometimes problematic. In addition, these groups require a relatively complex system of connections, both for the hydraulic connection of the power and actuation units to each other and for the electrical connections of the two units to the external power and control connections.

Obviously, such complexity entails relatively high manufacturing, materials and installation costs, and therefore negatively affects not just the economic aspect, but also the reliability of the electro-hydraulic actuation group.

The object of the present invention is to make an electro-hydraulic actuation group for an automotive servo-assisted mechanical transmission, this group being devoid of the above-described drawbacks.

According to the present invention, an electro-hydraulic actuation group is made for an automotive servo-assisted mechanical transmission according to the attached claims.

BRIEF DESCRIPTION OF THE DRAWINGS

The invention shall now be described with reference to the enclosed drawings, which illustrate a non-limitative embodiment, where.

PREFERRED EMBODIMENTS OF THE INVENTION

Figure 1:
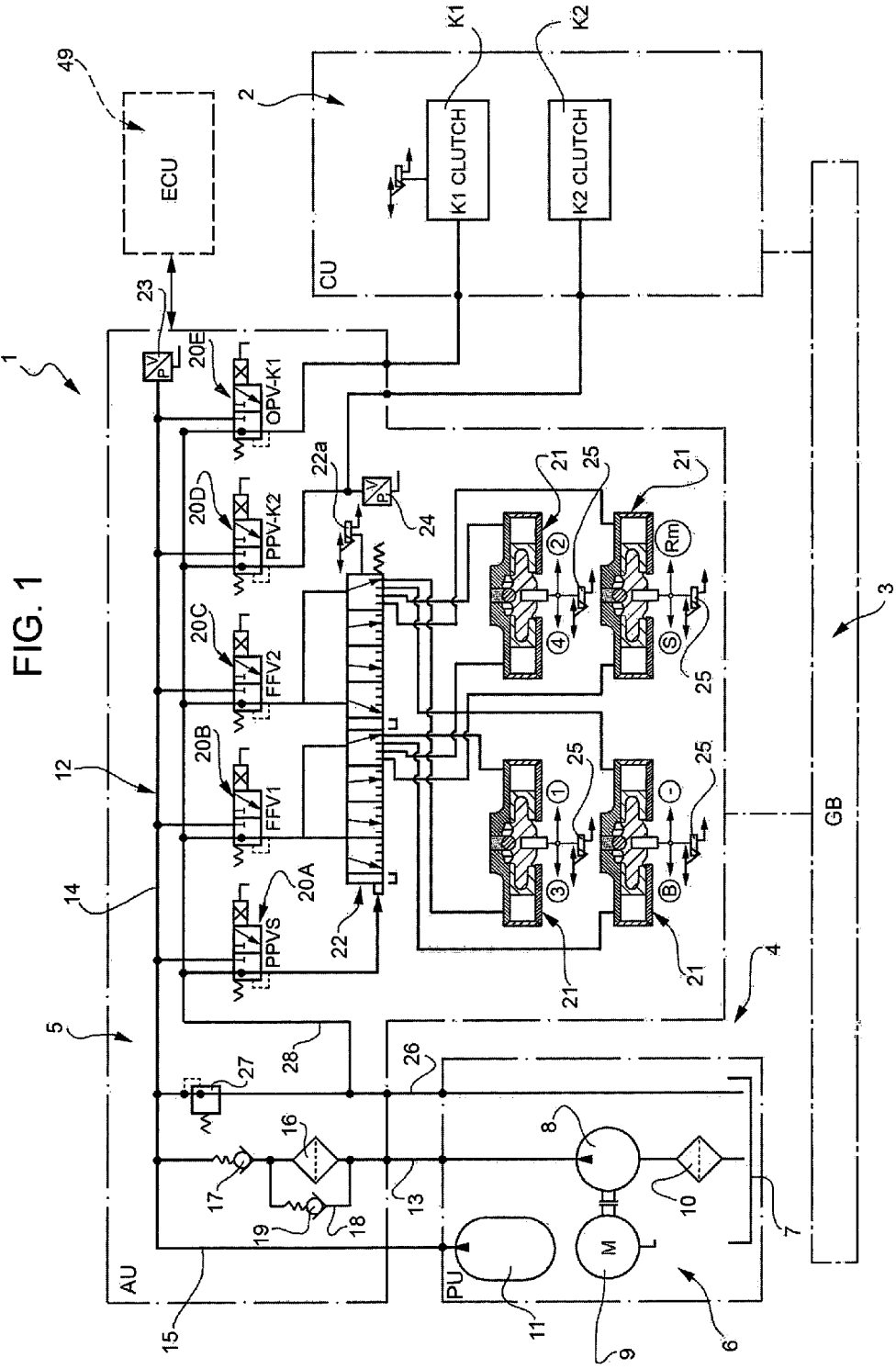
FIG. 1 is a hydraulic diagram of a servo-assisted mechanical transmission.

FIG. 1 shows the hydraulic diagram of a servo-assisted mechanical transmission 1 for a vehicle (not shown).

According to the schematization in FIG. 1, the servo-assisted mechanical transmission 1 can be functionally subdivided into four blocks: a Clutch Unit (CU) block comprising a clutch unit 2, in turn comprising two dry clutches K1 and K2 of known type, a Gear Box (GB) block comprising a mechanical gearbox 3 of known type, and two blocks, a Power Unit (PU) and an Actuation Unit (AU), which together define an electro-hydraulic actuation group 4 for operating the clutch unit 2 and for selecting and engaging gears in the gearbox 3.

In particular, the AU block comprises an actuation unit 5 and the PU block comprises a power unit 6, which is connected to the actuation unit 5 to provide, during use, the same actuation unit 5 with the hydraulic pressure necessary for its operation.

In the known manner, the power unit 6 comprises a tank 7 for the oil, a gear pump 8, which is driven by an electric motor 9 and is able to suck oil from the tank 7 through a suction filter 10, and a pressurised oil accumulator 11 connected to the pump 8.

The actuation unit 5 comprises a hydraulic circuit 12, in turn comprising a feed line 13 that is connected to the delivery side of the pump 8, a distribution line 14 designed to receive oil under pressure from the feed line 13, and a supply line 15 connected to the accumulator 11. The supply line 15 also acts as a load line for the accumulator 11 during operation of the pump 8. The feed line 13 extends through a feed filter 16 and a non-return valve 17 placed in series and is equipped with a bypass line 18, which is designed to bypass the feed filter 16 in the feed direction of the oil and includes a non-return valve 19.

The distribution line 14 has five branches able to supply oil under pressure to respective electro-hydraulic valves 20 (of known type), which are part of the actuation unit 5 and, in use, are operated by a transmission control unit (not shown in FIG. 1) to control the supply of oil under pressure to both the clutch unit 2 and four double-effect pistons 21 (of known type), which are also part of the actuation unit 5 and control gear engagement inside the gearbox 3.

More in detail, as shown in the diagram in FIG. 1, the five electro-hydraulic valves 20 comprise:
- an electro-hydraulic valve 20A able to control a hydraulic servo-valve 22 for switching the hydraulic connections for gear selection,
- two electro-hydraulic valves 20B and 20C able to control the supply of oil from the distribution line 14 to the double-effect pistons 21 through the hydraulic servo-valve 22 and, lastly,
- two electro-hydraulic valves 20D and 20E able to control the supply of oil from the distribution line 14 to the respective hydraulic actuators of the clutches K1 and K2.

The hydraulic circuit 12 also comprises a plurality of sensors, including a position sensor 22a for the hydraulic servo-valve 22, a pressure sensor 23 arranged on the distribution line 14, a pressure sensor 24 arranged on an outlet of electro-hydraulic valve 20D associated with clutch K2, and four position sensors 25, each of which is associated with a respective double-effect piston 21.

According to a variant that is not shown, the position sensor 22a of the hydraulic servo-valve 22 can be absent and substituted by a predictive control system of the behaviour of the hydraulic servo-valve 22 itself.

Lastly, the hydraulic circuit 12 comprises an oil discharge line 26 that runs from the distribution line 14 to the tank 7 and is equipped with a pressure-relief valve 27 set to open when the pressure in the distribution line 14 exceeds a predetermined threshold. A collection line 28, connected to the respective discharge outlets of the five electro-hydraulic valves 20, also flows into the discharge line 26.

In practice, the discharge line 26 and the tank 7 constitute a single collection system, from which oil is sucked by the pump 8 through the suction filter 10.

The transmission 1 is electrically controlled by an electronic control unit (ECU), indicated in FIG. 1 by reference numeral 49.

Figure 2:
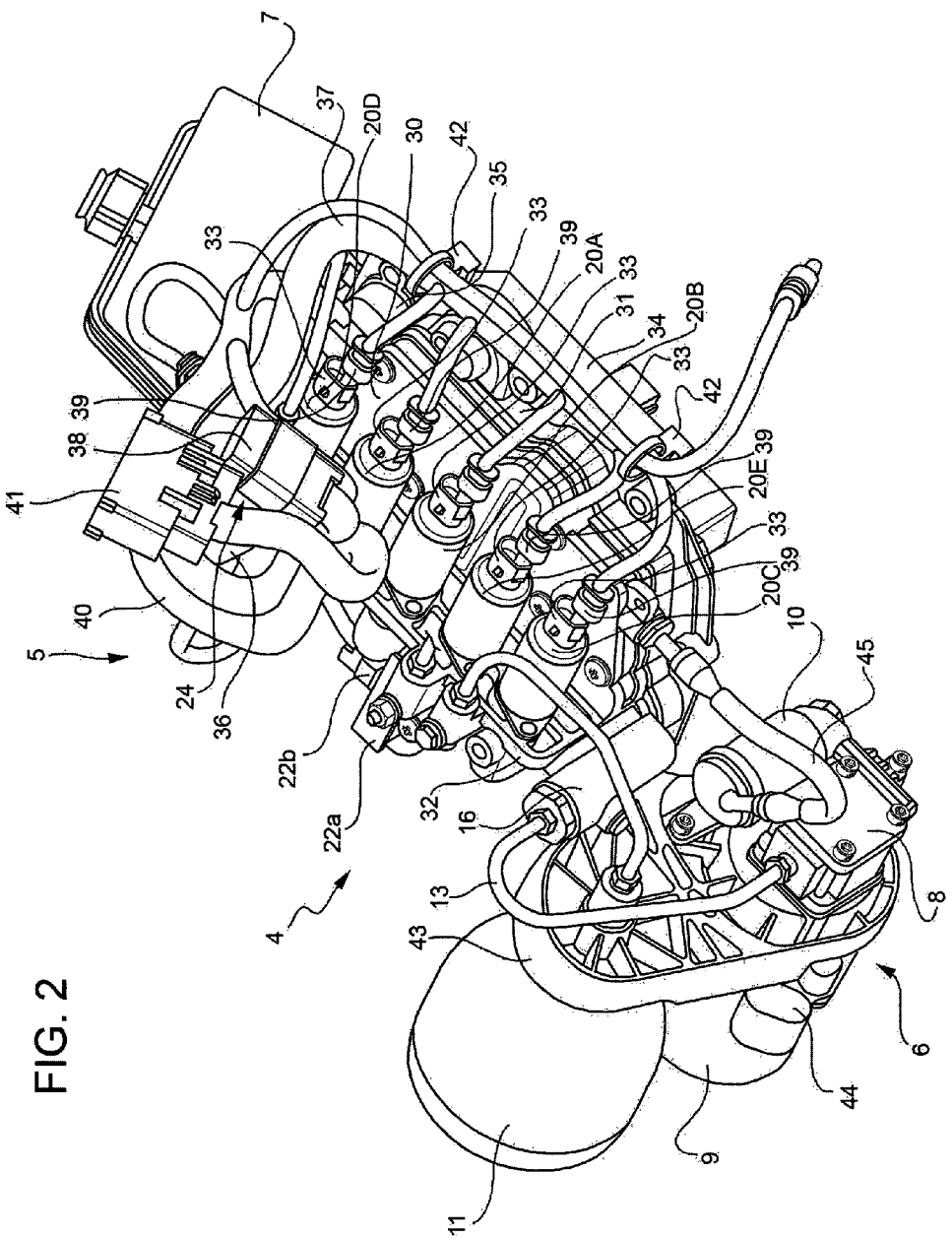
FIG. 2 shows a servo-hydraulic actuation group schematically represented in FIG. 1 and made according to the known art.

As shown in FIG. 2, in an electro-hydraulic actuation group 4 made according to the known art, the actuation unit 5 and power unit 6 define two distinct assemblies, made integral with each other by means of a connection element.

In particular, the actuation unit 5 comprises a generally parallelepipedal hydraulic casing 29 defined by an upper shell 30 and by a lower shell 31 rigidly connected to each other and defining, between them, part of the hydraulic circuit 12.

The hydraulic casing 29 supports all the other components of the actuation unit 5, some of which are mounted externally on the hydraulic casing 29 and some of which are instead housed in respective seats obtained inside the upper 30 or lower 31 shell.

As shown in FIG. 2, the upper shell 30 has an outer surface provided with a longitudinal rib 32, which projects transversally from the above-mentioned outer surface and supports the electro-hydraulic valves 20, arranged side-by-side and evenly set apart from each other. In particular, the electro-hydraulic valves 20 are housed in respective seats obtained in the upper shell 30 and extend, each one parallel to the other, in a direction of insertion substantially perpendicular to the rib 32. Each electro-hydraulic valve 20 is provided with an electrical connector 33 positioned at the free axial end of the respective electro-hydraulic valve 20 and which extends in the above-mentioned direction of insertion.

On the opposite side of the hydraulic casing 29, the lower shell 31 supports a sensor module 34 housing a plurality of sensors, including position sensors 25, able to measure, in a known manner, respective quantities correlated to the operation of the electro-hydraulic actuation group 4. The sensor module 34 is fitted with an electrical connector 35 positioned at one end of the hydraulic casing 29 between the electro-hydraulic valves 20 and the tank 7.

The position sensor 22a of the hydraulic servo-valve 22 is instead mounted on the side of the rib 32 opposite to the one supporting the electro-hydraulic valves 20 and is provided with an associated electrical connector 22b.

Lastly, the pressure sensor 24 associated with clutch K2 is mounted on a longitudinal end of the rib 32 on the opposite side from the electro-hydraulic valves 20 and is provided with an associated connector 36.

At one end, the hydraulic casing 29 also supports the tank 7 and, at the opposite end, the feed filter 16, which comprises a cylindrical outer body having an axis substantially perpendicular to the connecting plane of the upper 30 and lower 31 shells.

The actuation unit 5 is electrically connected to a control unit (not shown in FIG. 2) of the transmission 1 by cabling comprising a power line, which provides power to the electrical components of the actuation unit 5, and a signal line, which transmits the signals collected by the actuation unit 5 via its sensors to the control unit.

As shown in FIG. 2, the power line comprises a bundle of cables 37 having a watertight electrical input connector 38 and comprising a plurality of cables, fitted at their ends with respective watertight electrical connectors 39 connected to the electrical connectors 33 of the electro-hydraulic valves 20.

Similarly, the signal line comprises a bundle of cables 40 having a watertight electrical output connector 41 and comprising a plurality of cables, fitted with respective watertight electrical connectors at their ends and connected to electrical connector 35 of sensor module 34, electrical connector 36 of pressure sensor 24 and electrical connector 22b of position sensor 22a. The bundles of cables 37 and 40 are held together by retaining clips 42 so as to form a tidy assembly, at least in part.

As shown in FIG. 2, the power unit 6 is positioned at the side of the actuation unit 5 and comprises a bracket 43 that supports all of the other components of the power unit 6 and is rigidly connected to the hydraulic casing 29 in a position facing the feed filter 16 so as to define the above-mentioned connection element and make the two units integral with each other. In particular, the following are mounted on the bracket 43: the accumulator 11, which is connected to the actuation unit 5 via the supply line 15 (FIG. 1), the motor 9, which is fitted with an electrical connector 44 suitable for connecting the motor 9 to an electrical actuator (not shown) normally installed on the vehicle (not shown), the pump 8, which is positioned in line with the motor 9 and is connected to the feed filter 16 via a tube that partly defines the feed line 13 (FIG. 1) and, lastly, the suction filter 10, which is placed at the side of the pump 8 and is fluidically connected to the discharge line 26 of the hydraulic circuit 12 via a tube 45 that runs from an inlet of the suction filter 10 to the hydraulic casing 29 and communicates with the discharge line 26 through a hole made in the upper shell 30 on the same side and close to the feed filter 16.

On this point, it is opportune to specify that inside the hydraulic casing 29, the discharge line 26 is defined by a channel obtained partly in the upper shell 30 and partly in the lower shell 31 and is positioned along a peripheral portion of the hydraulic casing 29. In this way, since the pressure in the discharge line 26 is close to the ambient pressure, it is possible to avoid sealing problems along the connection portion of the shells, unlike what might occur if the above-mentioned connection portion was instead along a high-pressure channel of the hydraulic circuit 12.

Figure 3:
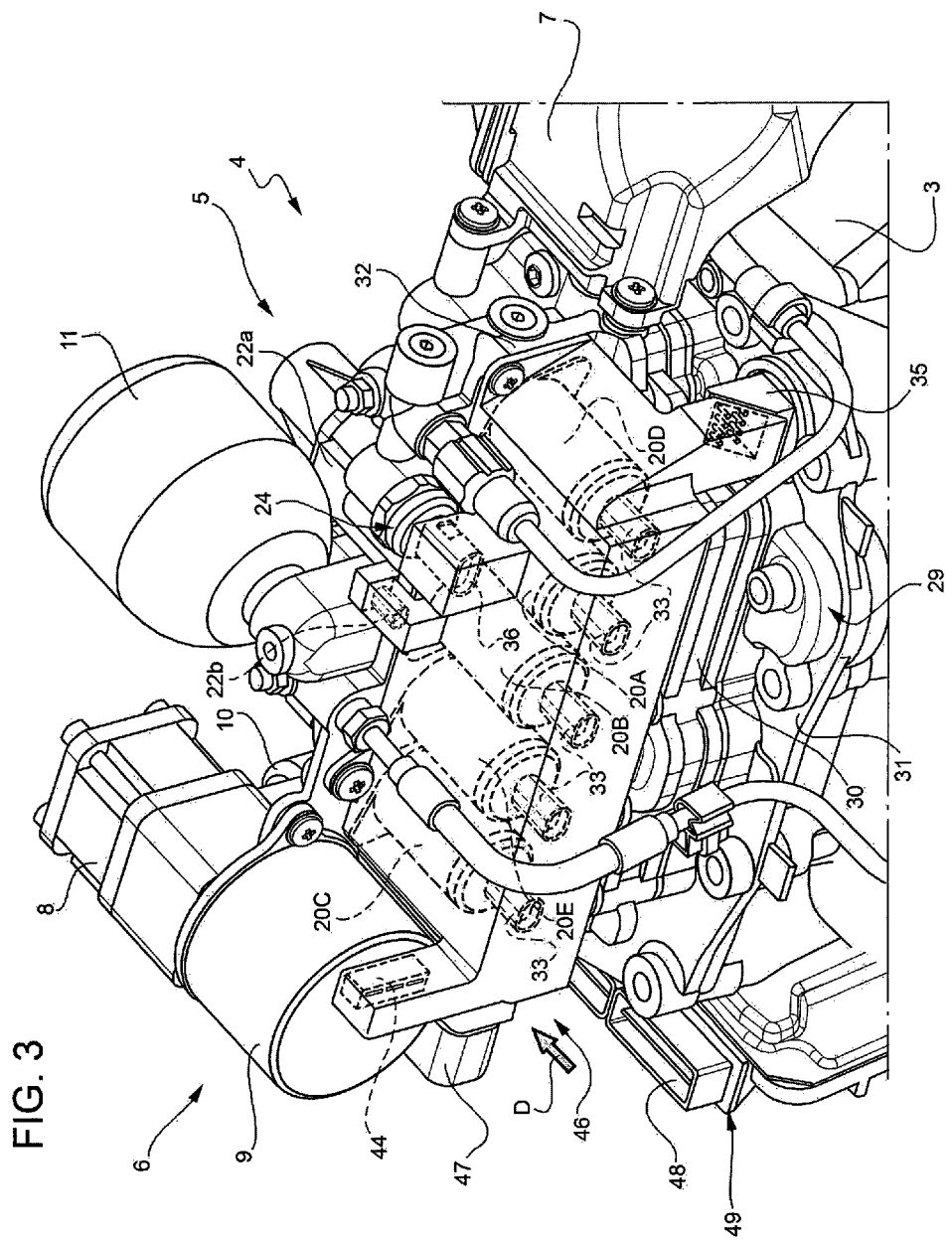
FIG. 3 shows a servo-hydraulic actuation group schematically represented in FIG. 1 and made according to the present invention.

The electro-hydraulic actuation group 4 shown in FIG. 3 mainly differs from the known one shown in FIG. 2 in relation to the arrangement of the components of the actuation unit 5 and power unit 6 inside the electro-hydraulic actuation group 4 itself, and in relation to the associated cabling. For this reason and for the sake of clarity, in the description that follows, the same reference numerals will be used, where possible, to indicate parts in FIG. 3 that are the same as or correspond to parts in FIG. 2.

With reference to FIG. 3, the actuation unit 5 and power unit 6 in the electro-hydraulic actuation group 4 are not two physically distinct assemblies rigidly connected to each other, as in the known example in FIG. 2, but are combined into a single assembly or block, which endows the electro-hydraulic actuation group 4 with compactness and enables the mechanical machining and components needed for the electro-hydraulic connections to be reduced to the minimum.

Figure 4:
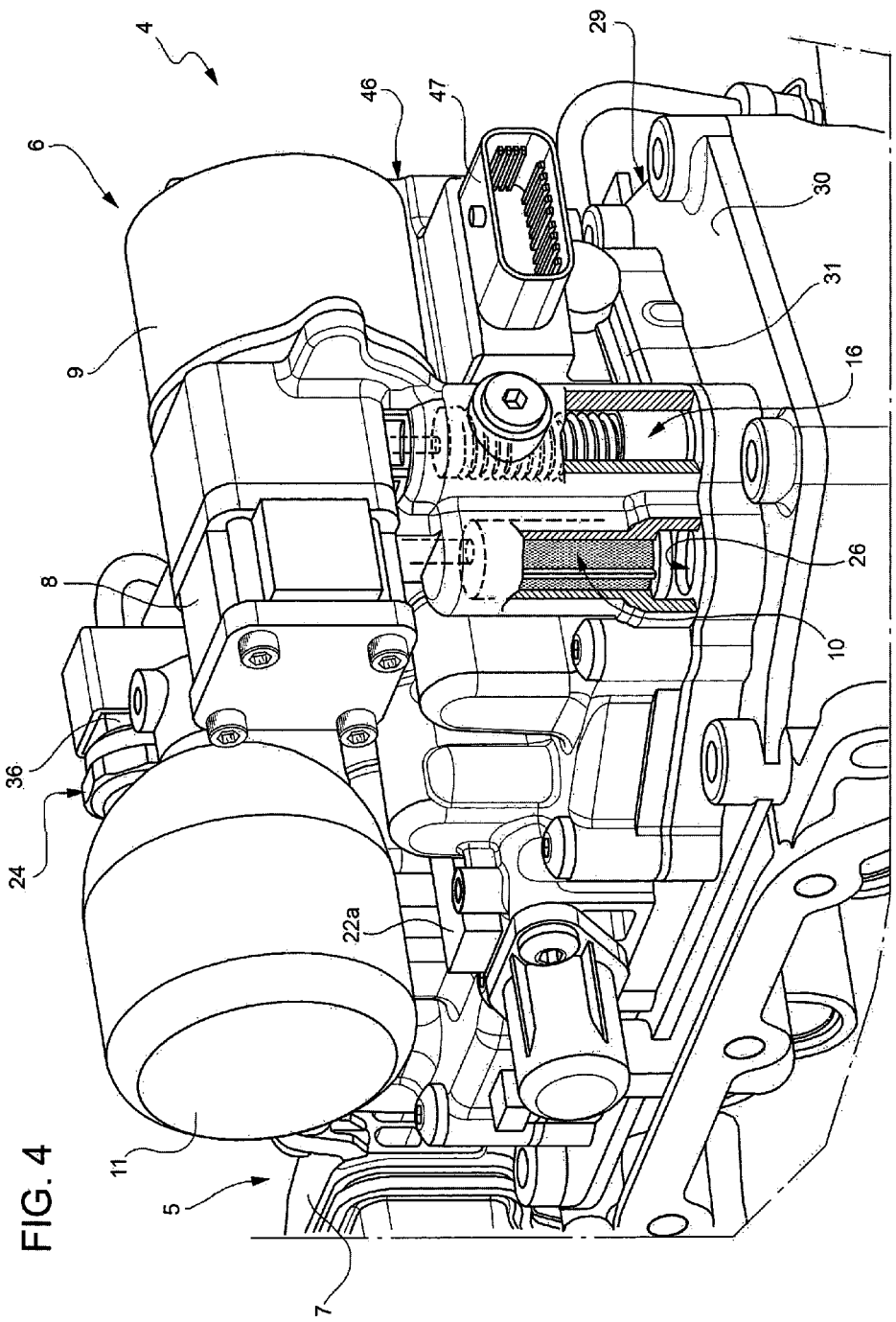
FIG. 4 shows the group in FIG. 3 from a different perspective.

As shown in FIGS. 3 and 4, the arrangement of the electro-hydraulic valves 20 on the upper shell 30 is substantially identical to that previously described with reference to FIG. 2, while the pump 8, the motor 9, the accumulator 11 and the suction filter 10 are mounted directly on the hydraulic casing 29. In particular, the accumulator 11 is supported by the upper shell 30 on the part of the rib 32 opposite to that supporting the electro-hydraulic valves 20 and is connected to the distribution line 14 via a channel that defines the supply line 15 and is obtained completely within the hydraulic casing 29, without the need for external piping.

La pump 8 and the motor 9 are mounted on the rib 32 and are aligned with each other along an axis parallel to the above-mentioned direction of insertion. In particular, the pump 8 finds itself on the same side as the accumulator 11 with respect to the rib 32, and the motor 9 finds itself on the same side as the electro-hydraulic valves 20; the electrical connector 44 of the motor 9 is positioned on a free axial end of the motor 9 and extends in a direction parallel to the above-mentioned direction of insertion.

As shown in FIG. 4, the feed filter 16 occupies a position on the hydraulic casing 29 substantially identical to that of the known example in FIG. 2 and the pump 8 is placed immediately above the feed filter 16 so as to permit direct connection between an outlet of the pump 8 and an inlet of the feed filter 16, consequently eliminating the need for an external connection pipe.

The suction filter 10 is mounted on the upper shell 30 at the side of feed filter 16, is parallel to the feed filter 16 and has an outlet that is directly connected to an inlet of the pump 8 and an inlet that tightly engages with an opening obtained in the upper shell 30 and directly facing the discharge line 26.

The arrangement of the suction filter 10 beneath the pump 8 and in direct fluidic communication with the discharge line 26 has the advantage of not only eliminating the need for an external connection pipe between the suction filter 10 and the hydraulic casing 29, but also of establishing a suction level for the pump 8 capable of guaranteeing the correct operation of the pump 8 itself and eliminating the risk of cavitation phenomena arising.

Figure 6:
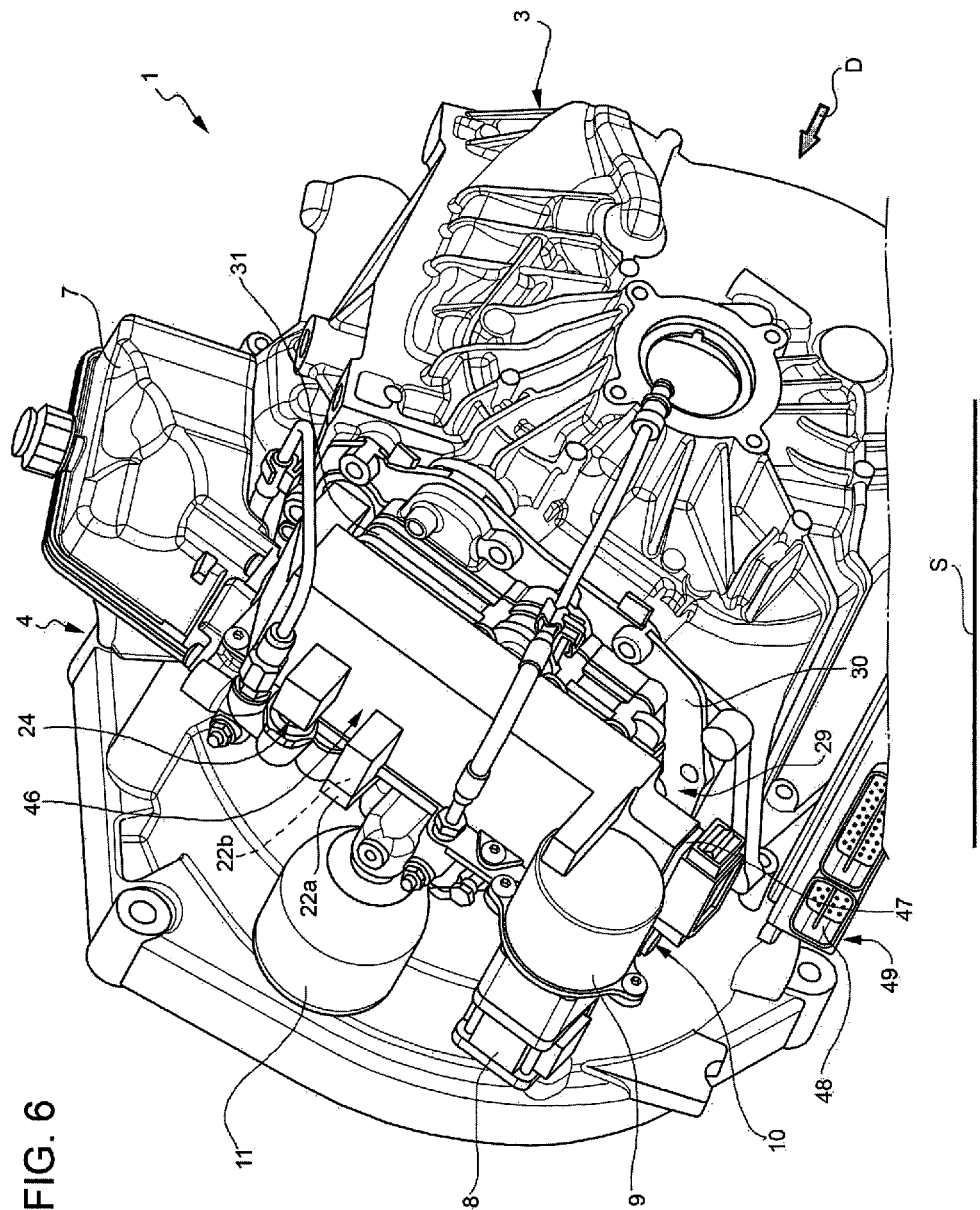
FIG. 6 shows a perspective view of a transmission including the group in FIGS. 3 and 4.

In fact, as is clearly noticeable in FIG. 6, which shows the position that the electro-hydraulic actuation group 4 assumes, once installed on the motor vehicle, with respect to the road surface (indicated by the letter S), the suction point of the suction filter 10 is the lowest point of the oil collection system, jointly defined by the tank 7 and the discharge line 26 inside the hydraulic casing 29.

As shown in FIG. 3, pressure sensor 24 is supported by the rib 32 and is positioned, with respect to the rib 32 itself, on the same side as the electro-hydraulic valves 20 and the motor 9, and the associated electrical connector 36, like the electrical connector 44 of the motor 9, extends in a direction parallel to the above-mentioned direction of insertion.

On opposite sides of the pressure sensor 24, the rib 32 has two communicating openings with respective outlets of two of the electro-hydraulic valves 20 and engaged by respective pipes able, in use, to feed oil under pressure to the hydraulic actuators of the clutches K1 and K2.

With respect to that described above, it clearly emerges that the presence of components of both the actuation unit 5 and the power unit 6 on the hydraulic casing 29 endow the electro-hydraulic actuation group 4 with an extremely compact structure in terms of volume and weight, and enable a significant reduction in the number of hydraulic connection components for the various components, with consequent advantages in terms of low costs and system reliability. Furthermore, since the components of the power unit 6 are installed on the upper shell 30 such that the mechanical machining necessary for their positioning is in the same direction as those already present on the upper shell 30 (in particular the machining for the positioning of the motor 9, the pump 8 and the accumulator 11 is in the same direction of insertion of the electro-hydraulic valves 20), considerable savings are derived in terms of costs and machining and assembly times for the electro-hydraulic actuation group 4.

Figure 7:
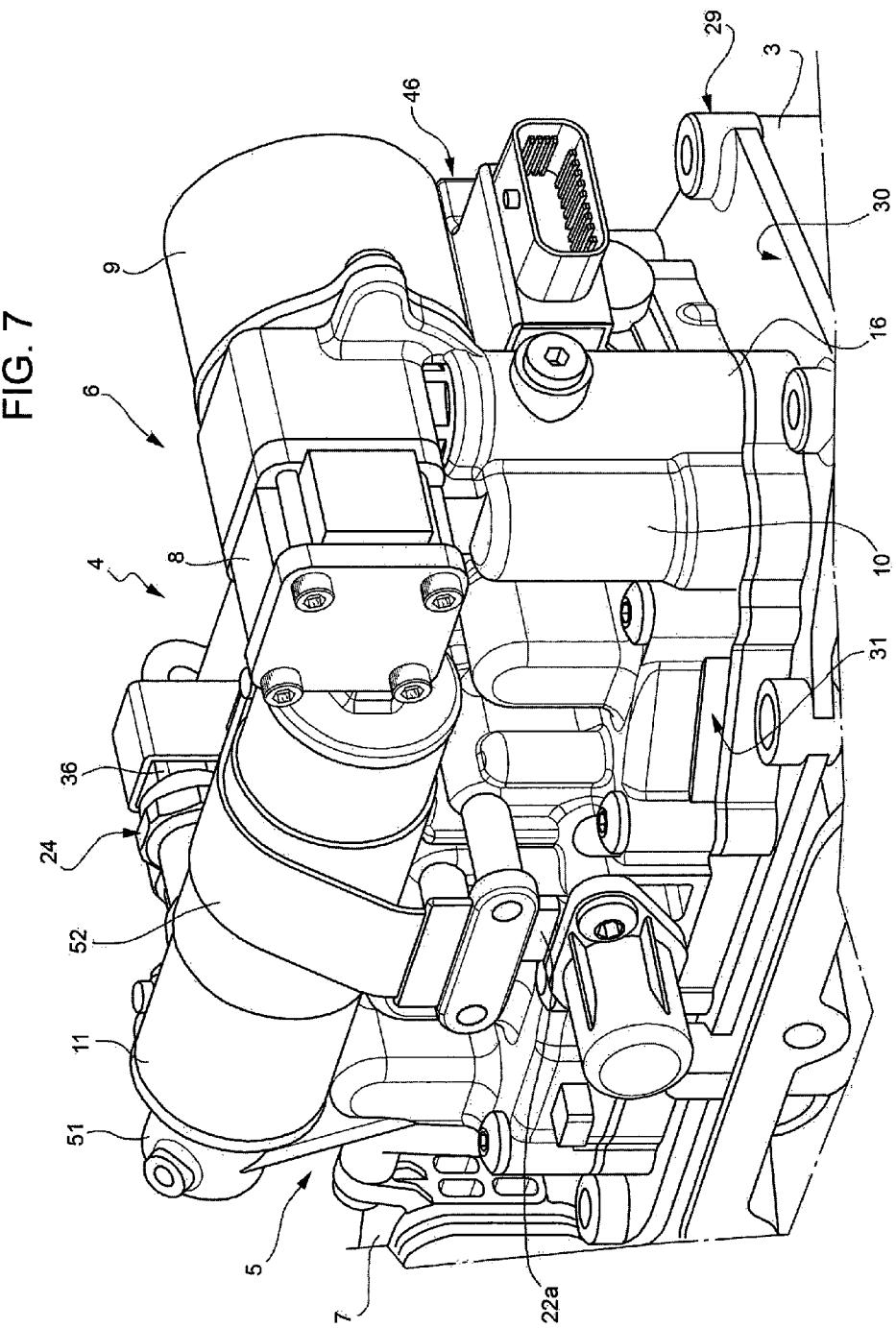
FIG. 7 shows a variant of the group in FIG. 4.

The embodiment shown in FIG. 7 differs from that described above only with regard to the shape and arrangement of the accumulator 11 and enables further improvement in the compactness and solidity of the structure. In this case, as shown in FIG. 7, the accumulator 11 is defined by a cylindrical body that is cantilever mounted on an appendage 51 projecting from the end of the rib 32 facing the tank 7 and extends parallel to the rib 32 from the part of the rib 32 opposite to the electro-hydraulic valves 20. In order to stiffen the structure, the accumulator 11 is partially wrapped with a retaining band 52 anchored to the rib 32 in a removable manner.

As previously described, the components of the actuation unit 5 and power unit 6 are positioned on the hydraulic casing 29 so that the respective electrical connections are all arranged on the same side of the hydraulic casing 29, extending in respective directions parallel to the above-mentioned direction of insertion of the electro-hydraulic valves 20 and are therefore able to all be simultaneously engaged, in a same direction of coupling, by a single connection element.

Figure 5:
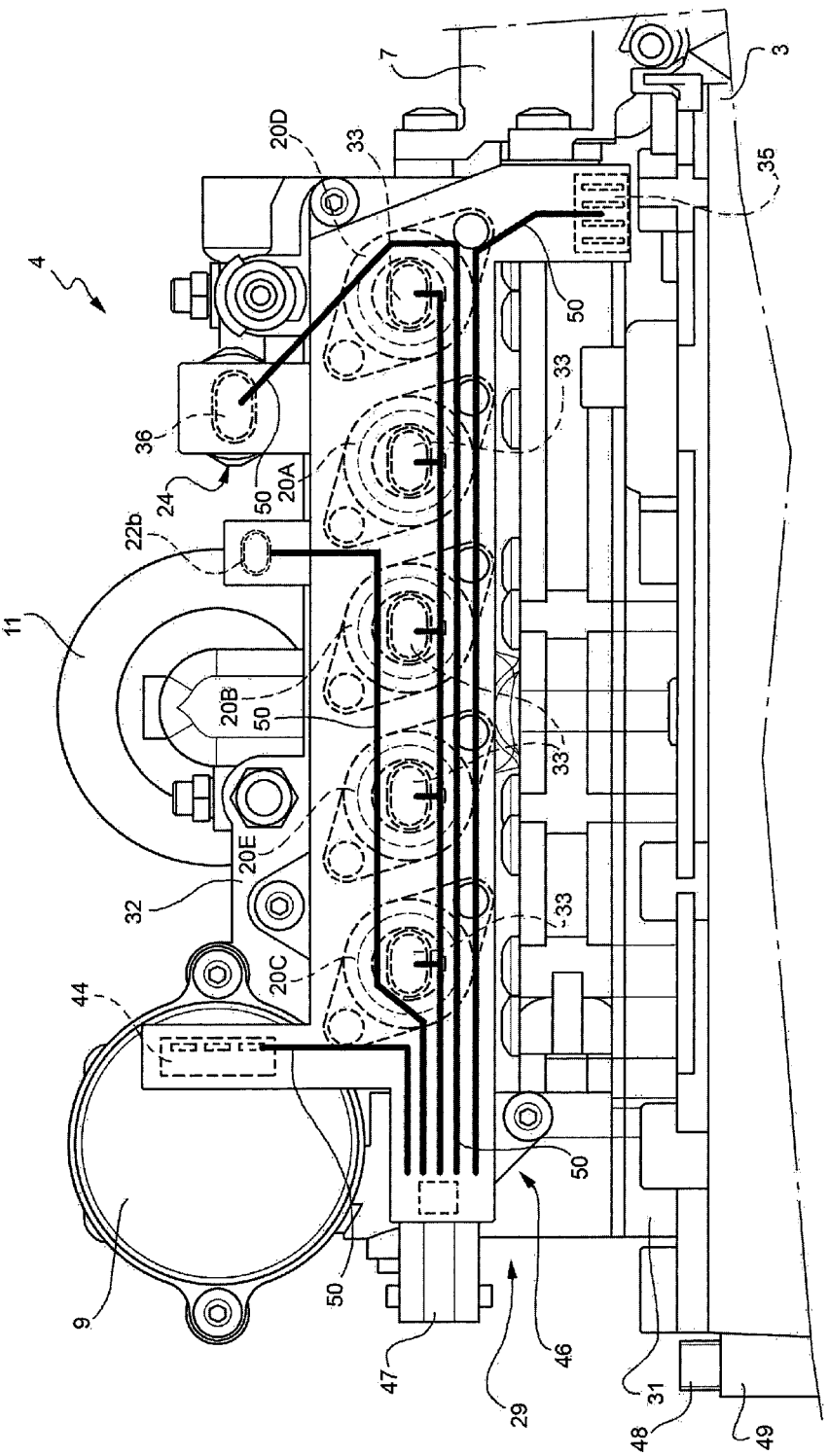
FIG. 5 is a side view of the group in FIGS. 3 and 4.

In particular, as shown in FIGS. 3, 5 and 6, the electronic control unit 49 is structurally separate from the assembly formed by the actuation unit 5 and the power unit 6 and is mounted, in a removable manner, on the gearbox 3 in an area away from the hydraulic casing 29 so that it can be easily accessed by an operator for servicing or maintenance without requiring the simultaneous disassembly of the actuation unit 5 and the power unit 6.

The electrical connector 44 of the motor 9, the electrical connectors 33 of the electro-hydraulic valves 20, the electrical connector 36 of the pressure sensor 24, the electrical connector 35 of the sensor module 34 and, lastly, the electrical connector 22b of the position sensor 22a are connected to the electronic control unit 49 via a multiple electrical connector 46, which simultaneously connects electrical connectors 33, 36, 35 and 22b and has an electrical input/output connector 47 that can be connected to an electrical input/output connector 48 of the electronic control unit 49 via an electrical cable (known and not shown).

In particular, the multiple electrical connector 46 is mounted on the shell 30, extending along the shell 30 itself from the motor 9 up to the tank 7 so as to completely cover the electro-hydraulic valves 20 and comprises a plurality of internal electrical connectors (not visible in the attached figures), each of which is connected to a respective electrical connector of a component of the actuation unit 5 and power unit 6 and is electrically connected to the electrical input/output connector 47 via a respective watertight electrically conductive track 50 (of known type and schematically indicated in FIG. 5 with a continuous line) co-printed in the multiple electrical connector 46. In other words, the above-mentioned internal electrical connectors define an input/output interface for connection of the multiple electrical connector 46 with the electrical components of the electro-hydraulic actuation group 4, and the electrical input/output connector 47 defines an electrical input/output interface for connection of the actuation unit 5 and power unit 6 with the electronic control unit 49.

The multiple electrical connector 46 is preferable made of a plastic material and is fixed to the upper shell 30 in a removable manner by screws or other fixing devices of known type.

In addition, as shown in FIGS. 3 and 6, the multiple electrical connector 46 is suitable for being mounted on the hydraulic casing 29 in a direction of coupling D parallel to the direction of insertion of the electro-hydraulic valves 20, enabling the simultaneous connection of all the electrical connectors arranged on the hydraulic casing 29.

The multiple electrical connector 46 can be designed to carry out a plurality of functions, based on technical choices and on the possible arrangement of the electronic components needed by the system.

In the example shown, the multiple electrical connector 46 comprises the above-mentioned electrical connectors (not shown) and the tracks 50, while other electronic components, such as the electrical actuator for piloting the motor 9 (known as a Smart Drive), remain separate from the multiple electrical connector 46; furthermore, in this case, the electronic control unit 49 comprises both the power electronics and the control electronics for piloting the electro-hydraulic valves 20 and the electro-hydraulic valve 22.

According to an embodiment not shown, the multiple electrical connector 46 also comprises the electrical actuator for piloting the motor 9 and the power electronics for piloting the electro-hydraulic valves 20, while the electronic control unit 49 comprises just the control electronics; in this case, the electrical input/output connector 47 comprises signal terminals and electric power supply terminals.

The invention claimed is:

1. An electro-hydraulic actuation group for an automotive servo-assisted mechanical transmission, the electro-hydraulic actuation group comprising an actuation unit, a power unit designed to provide hydraulic pressure to the actuation unit and an electronic control unit; the power unit comprising first components including a pump and an electric motor, which is designed to operate the pump and is provided with a first electrical connector, and the actuation unit comprising a hydraulic casing, second components provided with second electrical connectors, and a hydraulic circuit fluidically connected to the pump to supply, in use, a fluid under pressure to the second components; the hydraulic casing comprising a first and a second shell, which are rigidly connected to each other and define at least part of said hydraulic circuit therebetween; the first shell having an outer surface located on the side of the hydraulic casing facing away from the second shell; and the second components comprise electro-hydraulic valves, which are configured to actuate respective servo-assisted members of the transmission, are housed in respective seats provided on said outer surface of the first shell and are fitted with respective ones of the second electrical connectors; a sensor module carried by the second shell and fitted with a respective one of the second electrical connectors; and a pressure sensor, which is associated to an outlet of one of the electro-hydraulic valves, is carried by the first shell and is fitted with a respective one of the second electrical connectors; the electro-hydraulic actuation group being wherein the first and the second components all are directly mounted on the hydraulic casing so as to define a single assembly; and wherein the first and second electrical connectors are arranged such that they can all be engaged by a same multiple electrical connector device, which is mounted on said outer surface of the first shell in a removable manner and is provided with an electrical input/output interface for the electrical connection of the actuation unit and the power unit with the electronic control unit, wherein the second components comprise a feed filter that is mounted on the first shell beneath the pump and has an inlet directly coupled to a delivery side of the pump, and an outlet on the first shell and communicating in a fluidic manner with a feed line of the hydraulic circuit; and the first components comprise a suction filter, which is mounted on the first shell beneath the pump and is arranged at the side of, and parallel to, the feed filter and has an outlet that is directly coupled to a suction inlet of the pump and an inlet that is directly coupled to an opening obtained on the first shell and communicating in a fluidic manner with a discharge line of the hydraulic circuit; the suction filter and feed filter being arranged to extend transversal to a direction of assembly of the electro-hydraulic valves.

2. The electro-hydraulic actuation group according to claim 1, wherein the multiple electrical connector device is equipped with third electrical connectors able to match with respective said first and second electrical connectors and a fourth electrical input/output connector, which defines said electrical input/output interface, is electrically connected to the third electrical connectors and is suitable for being connected to an external electrical input/output connector.

3. The electro-hydraulic actuation group according to claim 2, wherein the multiple electrical connector device also comprises electronic power components of at least part of the first and/or second components.

4. The electro-hydraulic actuation group according to claim 1, wherein the electronic control unit is structurally separated from said assembly and electrically connectable to the multiple electrical connector device.

5. The electro-hydraulic actuation group according to claim 1, wherein the first and the second components are arranged on the hydraulic casing such that the first and the second electrical connectors are all facing the same way and extend in their respective directions parallel to each other and to a direction of coupling with the multiple electrical connector device.

6. The electro-hydraulic actuation group according to claim 5, wherein the seats of said electro-hydraulic valves extend in respective directions parallel to each other and to a direction of assembly of the electro-hydraulic valves parallel to the direction of coupling.

7. The electro-hydraulic actuation group according to claim 5, wherein the pump and the motor are mutually aligned along an axis parallel to the direction of coup ling.

8. An automotive servo-assisted mechanical transmission comprising an electro-hydraulic actuation group according to claim 1.

* * * * *